United States Patent
Jeong et al.

(10) Patent No.: US 8,964,322 B2
(45) Date of Patent: Feb. 24, 2015

(54) SIZE ADJUSTABLE INTER-TRACK INTERFERENCE CANCELLATION

(71) Applicant: Seagate Technology LLC, Cupertino, CA (US)

(72) Inventors: Seungyoul Jeong, Kyunnggi-Do (KR); Joowon Cho, Kyunnggi-Do (KR); Donghyuk Park, Seoul (KR); Eunyeong Hong, Suwon-Si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/942,163

(22) Filed: Jul. 15, 2013

(65) Prior Publication Data

US 2015/0015983 A1  Jan. 15, 2015

(51) Int. Cl.
G11B 5/09 (2006.01)
G11B 20/10 (2006.01)

(52) U.S. Cl.
CPC .................. *G11B 20/10212* (2013.01)
USPC ............................................. 360/45

(58) Field of Classification Search
None
See application file for complete search history.

(56) References Cited

U.S. PATENT DOCUMENTS

| | | | |
|---|---|---|---|
| 5,721,816 A | 2/1998 | Kusbel et al. | |
| 7,493,550 B1 | 2/2009 | Kou et al. | |
| 8,300,339 B1 | 10/2012 | Nangare et al. | |
| 8,379,498 B2 | 2/2013 | Mathew et al. | |
| 8,429,507 B1 | 4/2013 | Kou et al. | |
| 8,441,750 B1 | 5/2013 | Nangare et al. | |
| 8,537,482 B1 | 9/2013 | Song et al. | |
| 2008/0151704 A1 | 6/2008 | Harada | |
| 2008/0174905 A1 | 7/2008 | Ueda | |
| 2010/0290151 A1* | 11/2010 | Kondo et al. | 360/71 |
| 2011/0292536 A1 | 12/2011 | Hongawa et al. | |
| 2012/0063022 A1 | 3/2012 | Mathew et al. | |
| 2012/0063023 A1 | 3/2012 | Mathew et al. | |
| 2012/0063024 A1 | 3/2012 | Mathew et al. | |
| 2012/0063284 A1 | 3/2012 | Mathew et al. | |
| 2012/0105994 A1 | 5/2012 | Bellorado et al. | |
| 2013/0021689 A1 | 1/2013 | Haratsch et al. | |
| 2013/0070362 A1 | 3/2013 | Mathew et al. | |
| 2013/0083417 A1 | 4/2013 | Worrell et al. | |
| 2013/0083418 A1 | 4/2013 | Worrell et al. | |
| 2013/0194699 A1 | 8/2013 | Matsuo et al. | |
| 2013/0223199 A1 | 8/2013 | Lund et al. | |
| 2014/0029133 A1 | 1/2014 | Tagami et al. | |
| 2014/0071559 A1 | 3/2014 | Toda et al. | |

OTHER PUBLICATIONS

Chang, et al., "Inter-Track Interference Mitigation for Bit-Patterned Magnetic Recording," IEEE Transaction on Magnetics, vol. 46, No. 11, Nov. 2010, 10 pgs.

(Continued)

*Primary Examiner* — Daniell L Negron
(74) *Attorney, Agent, or Firm* — Taylor English Duma LLP

(57) ABSTRACT

Technologies are described herein for cancelling inter-track interference in a storage device utilizing size-adjustable segments. Data is read from one or more sectors on a data track adjacent to a target sector on a target track of a recording medium of the storage device. The target sector is divided into a plurality of segments and data is decoded from the read signal read from each of the segments individually using corresponding data from the one or more sectors of the adjacent track and independent inter-track interference factor values.

18 Claims, 6 Drawing Sheets

(56) References Cited

OTHER PUBLICATIONS

Chang, et al; "Inter Track Interference Mitigation for Bit-Patterned Magnetic Recording," IEEE Transaction on Magnetics, col. 46, No. 11, Nov. 2010; 10 pgs.

Haratsch, et al.; "Intertrack Interference Cancellation for Shingled Magnetic Recording", IEEE Transactions on Magnetics, vol. 47, No. 10, Oct. 2011, 6 pgs.

Roh, et al.; "Single-Head/Single-Track Detection in Interfering Tracks", IEEE Transactions on Magnetics, vol. 38, No. 4, Jul. 2002, 9 pgs.

Wikipedia; "Cross-correlation", located at "http://en.wikipedia.org/wiki/Cross-correlation", last modified on Feb. 25, 2013, 4 pgs.

Park, Donghyuk; Non-Final Office Action for U.S. Appl. No. 13/840,650, filed Mar. 15, 2013, mailed Mar. 25, 2014, 13 pgs.

\* cited by examiner

US 8,964,322 B2

SIZE ADJUSTABLE INTER-TRACK INTERFERENCE CANCELLATION

BRIEF SUMMARY

The present disclosure relates to technologies for cancelling inter-track interference ("ITI") in a storage device, such as a hard-disk drive ("HDD") device, utilizing size-adjustable segments. According to some embodiments, a method of cancelling inter-track interference in a storage device comprises reading data from one or more sectors of a track adjacent to a target sector on a target track of a recording medium of the storage device. The target sector is divided into a plurality of segments and data is decoded from the read signal read from each of the segments individually using corresponding data from the one or more sectors of the adjacent track and independent inter-track interference factor values.

According to further embodiments, a computer-readable storage medium comprises processor-executable instructions that, when executed by a processor, cause the processor to read data from one or more sectors of an adjacent track of a recording medium, the one or more sectors of the recording medium being adjacent to a target sector on a target track of the recording medium. The target sector is divided into a plurality of segments and inter-track interference cancellation is performed on each of the plurality of segments using the data from the one or more sectors of the adjacent track to decode data from a read of the target sector.

According to further embodiments, a system comprises a hard disk drive comprising a recording medium and a controller comprising a processor and a memory. The controller may be configured to read data from one or more sectors of an adjacent track of the recording medium, the one or more sectors of the recording medium being adjacent to a target sector on a target track of the recording medium. The controller may then divide the target sector into a plurality of segments. The controller may determine an inter-track interference factor value for a first segment of the plurality of segments using a read signal read from the first segment and corresponding data from the one or more sectors of the adjacent track, and decode data from the read signal using the corresponding data from the one or more sectors of the adjacent track and the inter-track interference factor. The controller may repeat the determining and decoding step for a remainder of the plurality of segments of the target sector.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
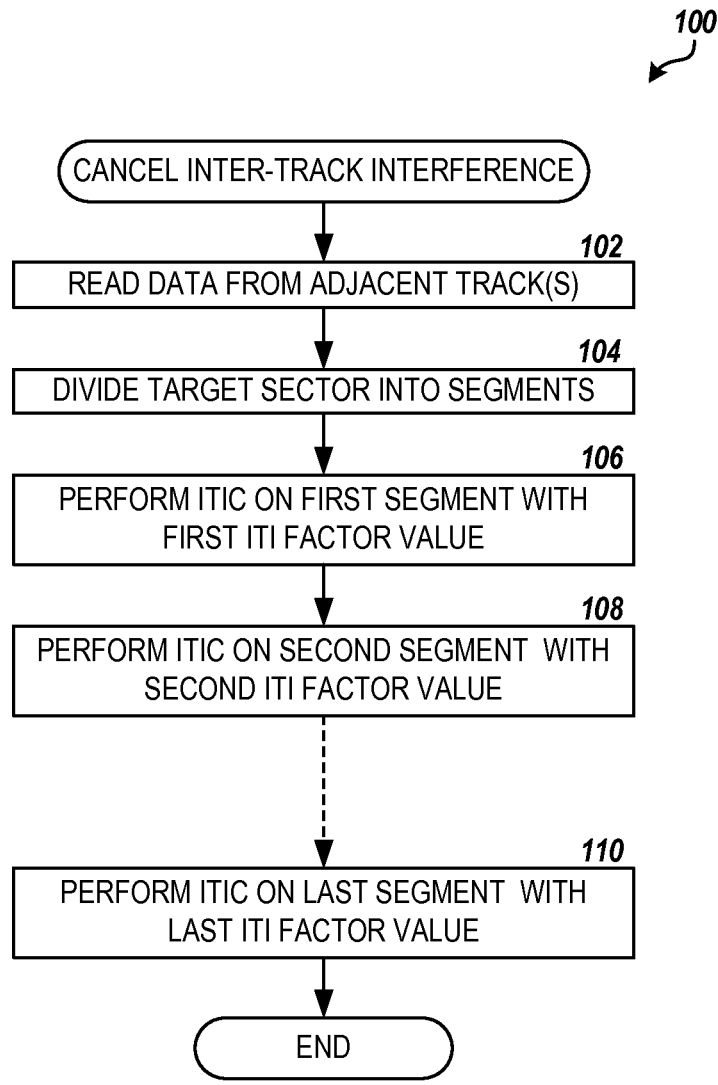
FIG. 1 is a flow diagram showing one method for cancelling inter-track interference utilizing size-adjustable segments, according to embodiments described herein.

The following detailed description is directed to technologies for cancelling inter-track interference in a storage device utilizing size-adjustable segments. A typical storage device may include a hard-disk drive ("HDD") device. The HDD device may contain a number of magnetic storage disks that include a number of generally concentric data tracks, the data tracks divided into sectors that contain the data stored on the device. As the storage capacity of HDD devices increase, the density of data tracks on the storage disks may also increase. This increase in track density may give rise to inter-track interference ("ITI") comprising interference in the read signal from a reader head of the HDD device when reading sectors from a target data track (referred to as track N) caused by the encroachment of the magnetic signal representing data stored in nearby sectors of adjacent or neighboring tracks (referred to as tracks N−1, N−2, N+1, N+2, etc.). The effect of ITI on the read signal may be further exacerbated by mechanical head misalignment, the size of the reader head, angle or skew of the reader head in regard to the target track N, magnetic flux leakage in the head, the use of shingled magnetic recording ("SMR") in recording the data tracks and the like.

The read channel and/or controller of an HDD device may include a mechanism for compensating for ITI in the read signal of the target sector of data track N. For example, the ITI compensation ("ITIC") mechanism may include circuitry or software that reads the data from the nearby sectors of the adjacent tracks, e.g., N−1, N+1 and the like, in order to calculate one or more ITI factors that describe the nature of the encroachment or influence of the data from adjacent tracks in the read signal from the target sector. These ITI factors may include an "alpha" factor indicating a magnitude of interference from an adjacent track. The ITI factors may alternatively or additionally include a "cross-correlation" factor that indicates a correlation between the signal from the target sector and that of the adjacent track(s). The ITIC mechanism may further include circuitry and/or software that apply the determined ITIC factors to the read signal from the target sector to mathematically cancel the interference from the adjacent track(s).

ITIC mechanisms in the read channel or controller of an HDD can be sector-based. In other words, an ITI factor regarding nearby sector(s) is determined for a target sector of a read operation and used in decoding the data from the read signal for the entire sector. However, variations in track alignment and other factors may result in different levels of ITI being present in different areas within a single sector. For example, a first half of a target sector may be encroached by 15% from the data on an adjacent data track N−1, while the second half of the sector may exhibit a 25% encroachment from the same track. In this case, the ITIC mechanism may be unable to determine a precise ITI factor value for the entire target sector in order to cancel the adjacent track interference.

According to embodiments presented herein, the calculation of ITI factor values and application of the factor values to the read signal may be performed over multiple, size-adjustable segments within a sector. This allows more precise ITIC to be performed on a sector containing variations in the levels or amounts of ITI from neighboring data tracks within the sector, improving accuracy of the ITIC and read performance of the storage device. In some embodiments, this may be implemented without changing the underlying ITIC mechanism of the storage device, but by changing the number of iterations ITIC applied to the target sector and the size of each segment of the sector to which each iteration of ITIC is applied.

FIG. 1 provides an overview of the ITIC methods and processes described herein. Specifically, FIG. 1 illustrates one routine 100 for cancelling inter-track interference in a storage device utilizing size-adjustable segments with independent factor values, according to some embodiments. The routine 100 may be performed in conjunction with the read of a target sector from the disk during normal operation of the storage device, for example. According to some embodiments, the routine 100 may be performed by a controller of the storage device. In other embodiments, the routine 100 may be performed by a computing system external to and operably connected to the storage device.

The routine 100 includes step 102, where data is read from one or more nearby sectors in one or more data tracks on the disk adjacent to the target data track. The data from the nearby sectors may be used by the ITIC mechanism to cancel the inter-track interference from the adjacent tracks. Next, the routine 100 proceeds to step 104, where the target sector is divided into a number of segments. The number and size of the segments may be fixed or may depend upon the individual target sector, track, disk, storage device or a combination of theses and/or other factors, as is described in more detail below.

From step 104, the routine 100 proceeds to step 106, where ITIC is performed on the first segment using a first ITI factor value. According to embodiments, the ITI factor value used in applying ITIC to each segment is determined independently based on the read signal read from the segment and the data from the nearby sector(s) read in step 102. The independently determined ITI factor value may then be used to cancel the inter-track interference from the adjacent track(s) in the read signal in order to decode the data stored in that segment. In some embodiments, the conventional ITIC mechanism in the storage device may be used to perform the ITIC on the segment.

From step 106, the routine 100 proceeds to step 108, where ITIC is performed on the second segment using a second ITI factor value. According to some embodiments, the value of the second ITI factor is independent of the first ITI factor value. The routine 100 continues iteratively through all of the segments of the target sector until, at step 110, ITIC is performed on the last segment. One ITIC has been performed for each of the segments of the target sector, the routine 100 ends.

Figure 2:
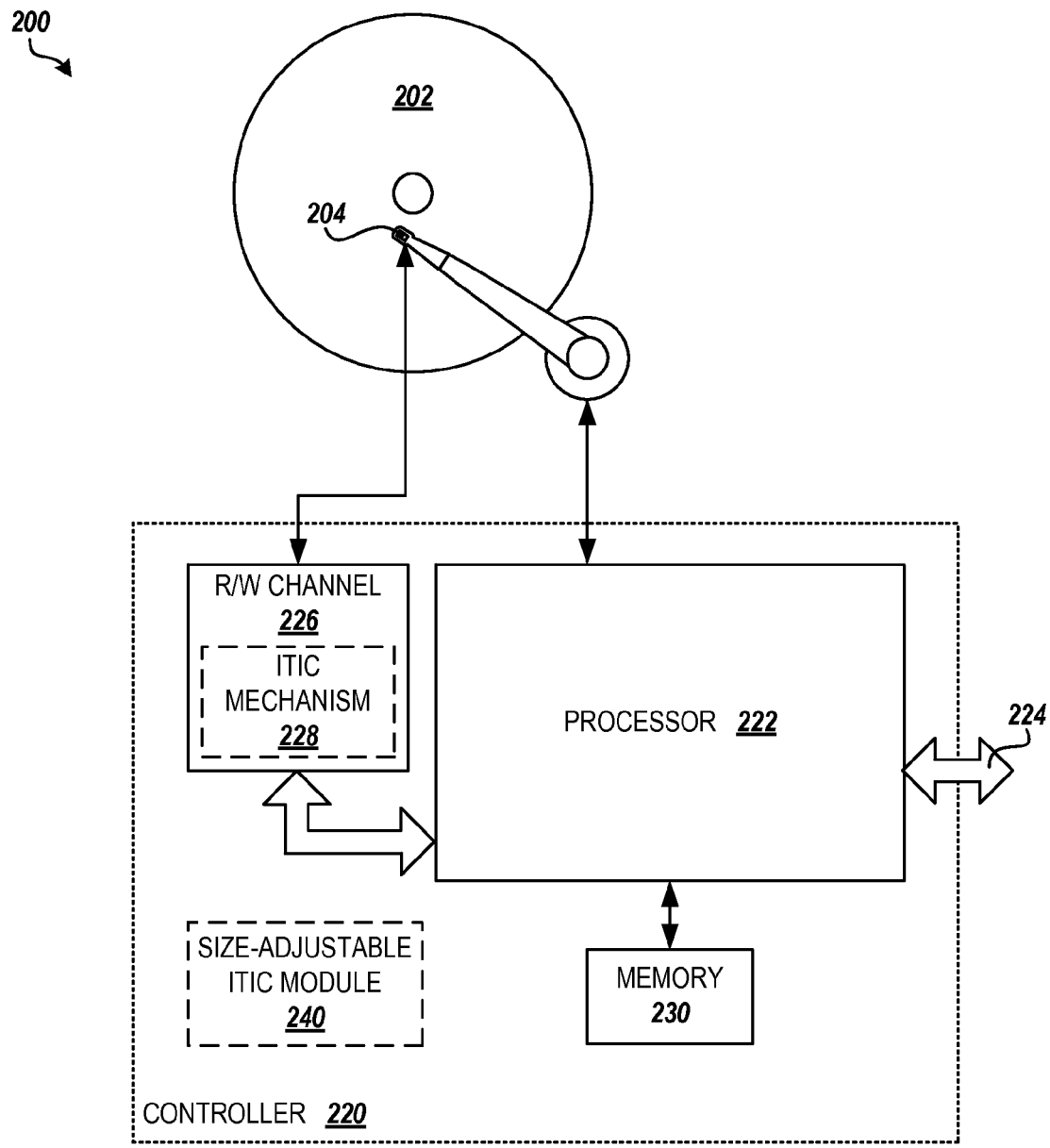
FIG. 2 is a block diagram showing an illustrative environment for cancelling inter-track interference in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for cancelling inter-track interference in the storage device 200, according to the embodiments provided herein. The storage device 200 may include recording media comprising at least one platter or disk 202.

The storage device 200 further includes at least one read/write head 204 located adjacent to the surface of each disk 202. The read/write head 204 may read information from the disk 202 by sensing a magnetic field formed on portions of the surface of the disk, and may write information to the disk by magnetizing a portion of the surface of the disk. It will be appreciated by one of ordinary skill in the art that the read/write head 204 may comprise multiple components, such as a magneto-resistive ("MR") or tunneling MR reader element, a writer element, an air bearing and the like.

Figure 3:
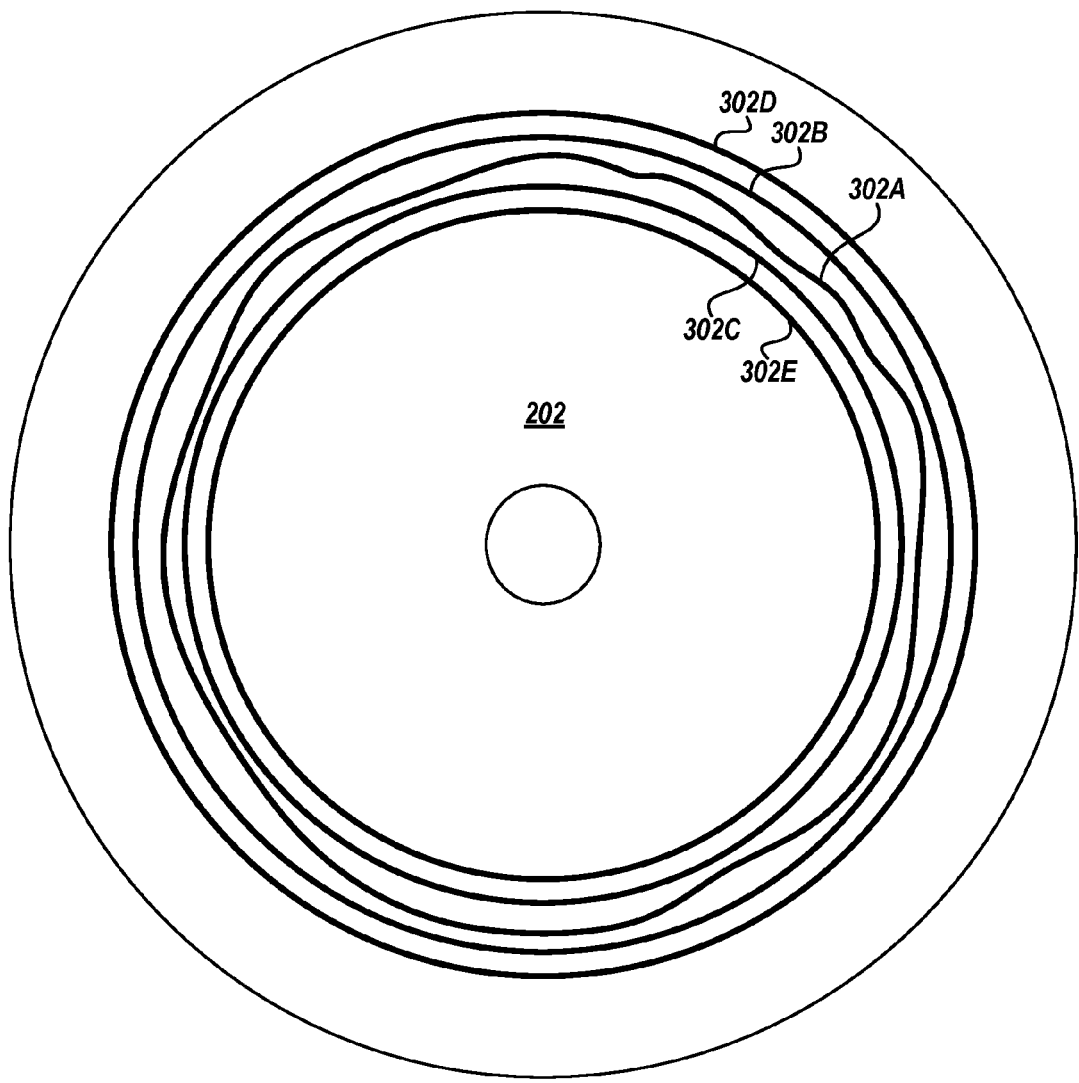
FIG. 3 is a block diagram showing an illustrative layout of data tracks on disk media, according to embodiments described herein.

The surface of the disk 202 may be divided or "formatted" into a number of individual data tracks, such as data tracks 302A-302E (referred to herein generally as data tracks 302) shown in FIG. 3. The data tracks 302 may represent substantially concentric circular areas on the surface of the disk 202. However, because of factors such as platter shift, platter geometry irregularity, vertical and horizontal platter vibrations, air fluctuations, mechanical alignment problems and the like, each data track may not be perfectly circular, such as data track 302A. Thus the distance between the centers of two adjacent data tracks, such as data track 302A (track N) and data track 302B (track N−1), may be different at various points along the data tracks.

Figure 4:
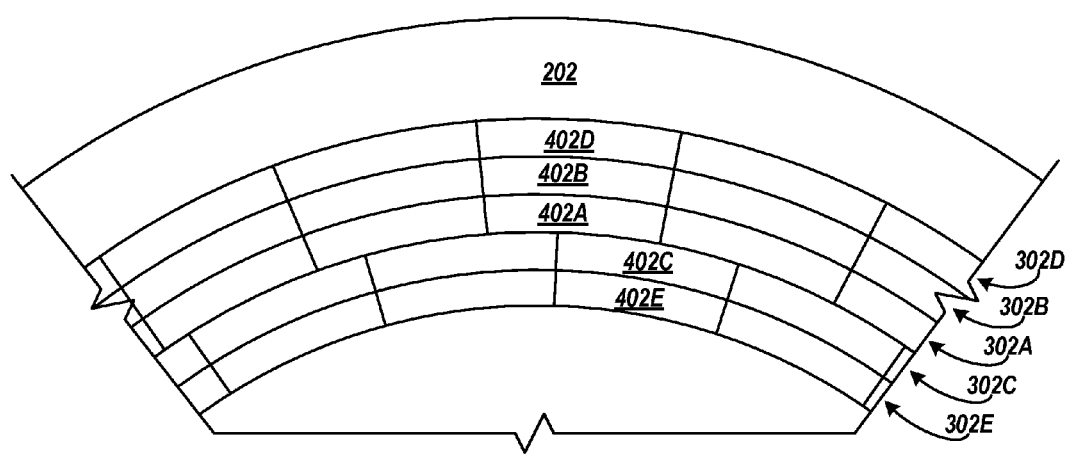
FIG. 4 is a block diagram showing an illustrative layout of sectors in data tracks on the disk media, according to embodiments described herein.

As shown in FIG. 4, each data track 302A-302E may further be divided or formatted into a number of sectors, such as sectors 402A-402E (referred to herein generally as sectors 402). The sectors 402 may represent independent areas of the data track 302 in which user data is stored. It will be appreciated that in some instances the sector boundaries of one data track, such as track N 302A, may align with the sector boundaries of an adjacent data track, such as track N−1 302B. This may be referred to as "aligned sector format." In other instances, the sector boundaries of a data track N 302A may not align with the sector boundaries of an adjacent data track, such as track N+1 302C. This is may be referred to as "non-aligned sector format." The disk 202 of a storage device 200 may be formatted with either or both of the aligned sector format and the non-aligned sector format, as further shown in the FIG. 4. Further, the number of sectors 402 per track may vary from data track 302 to data track on the surface of the disk 202.

Returning to FIG. 2, the storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a specific sector 402 on the surface of the disk 202 by moving the read/write head 204 radially across the data tracks 302 using the actuator while a motor rotates the disk to bring the target sector under the read/write head.

According to embodiments, the controller 220 may further contain an ITIC mechanism 228. The ITIC mechanism 228 may compensate for inter-track interference and other noise in the read signal from the read/write head 204 when reading data. The ITIC mechanism 228 may comprise a hardware circuit in the read/write channel 226, processor-executable instructions for execution in the processor 222 or any combination of these and other components in the controller 220. As described above, the ITIC mechanism 228 may have the capability to calculate values for one or more ITI factors, such as alpha or cross-correlation, from a read signal from the read/write head 204 while reading the target sector 402A of a target track N and data read from nearby sectors on one or more adjacent tracks N−1, N+1, etc. The ITIC mechanism may further use the calculated ITI factor value(s) to cancel the ITI in the read signal in order to decode the data stored in the target sector 402A.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the memory 230 may store a firmware that comprises commands and data necessary for performing the operations of the storage device 200. According to some embodiments, the memory 230 may store processor-executable instructions that, when executed by the processor, perform the routines 100 and 600 for cancelling inter-track interference in the storage device 200, as described herein.

In addition to the memory 230, the environment may include other computer-readable media storing program modules, data structures, and other data described herein for cancelling inter-track interference of the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a size-adjustable ITIC module 240. The size-adjustable ITIC module 240 may perform the methods and processes described herein for cancelling inter-track interference in the storage device 200 utilizing size-adjustable segments. According to some embodiments, the size-adjustable ITIC module 240 may be implemented in the controller 220 as software, hardware, or any combination of the two. For example, the size-adjustable ITIC module 240 may be stored in the memory 230 as part of the firmware of the storage device 200 and may be executed by the processor 222 for performing the ITIC methods and processes described herein.

The size-adjustable ITIC module 240 may alternatively or additionally be stored in other computer-readable media accessible by the controller 220. In further embodiments, the size-adjustable ITIC module 240 may be implemented in a computing system external to and operably connected to the storage device 200, such as in a driver module of a host device connected to storage device through the interface 224, for example. The size-adjustable ITIC module 240 may further be stored in a memory or other computer-readable media accessible by the computing system and be executed by a processor of the computing system.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 5:
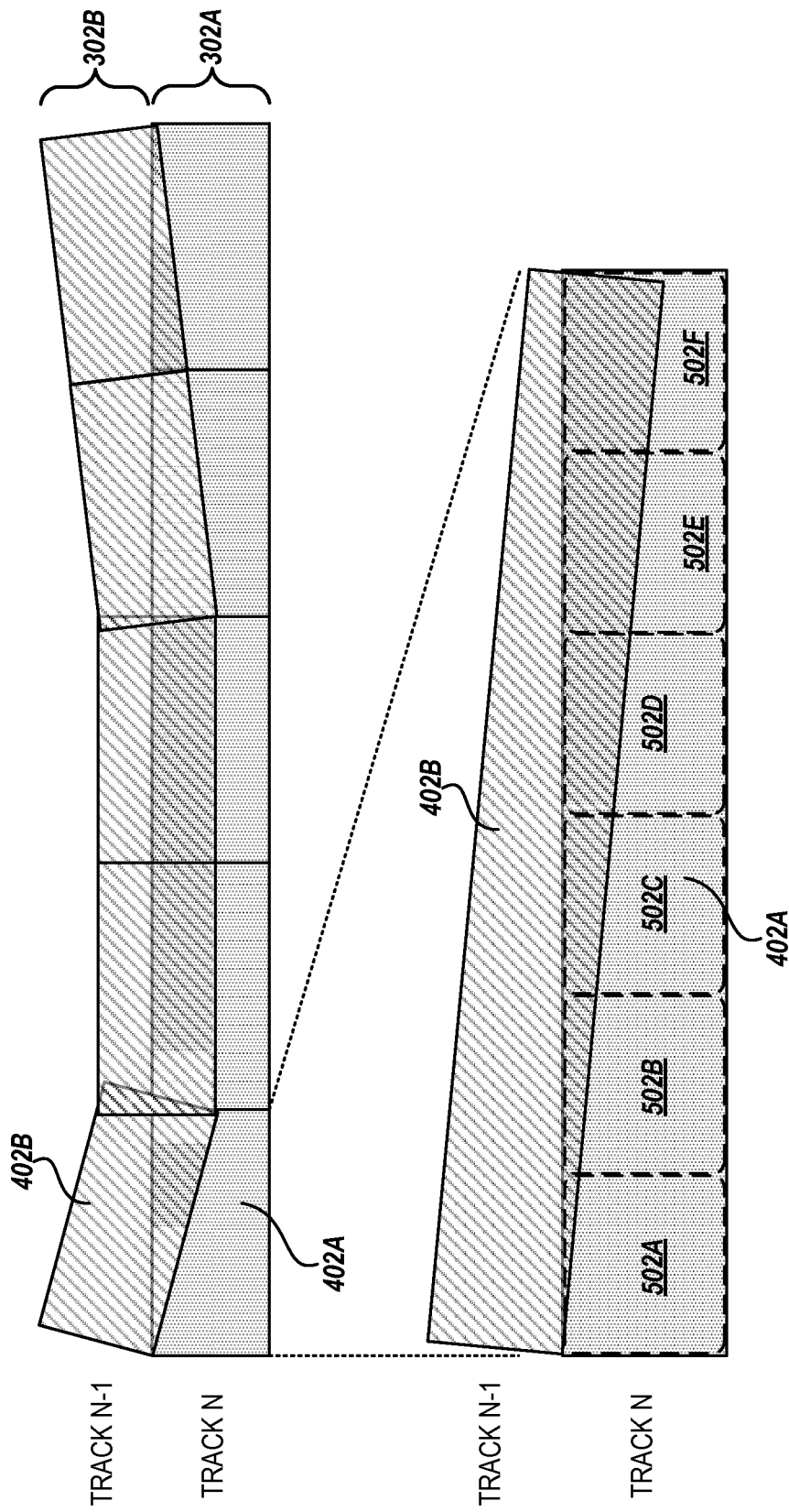
FIG. 5 is a block diagram showing aspects of size-adjustable segments for inter-track interference cancellation, according to embodiments described herein.

FIG. 5 shows aspects of variations in the levels or amounts of ITI with a sector 402 that may be caused by variations in encroachment of the magnetic field or other influence of data stored on adjacent data tracks 302 on the disk 202 of the storage device 200, according to some embodiments. Specifically, FIG. 5 shows varying levels of encroachment of data in sectors, such as sector 402B, of an adjacent data track, such as track N−1 302B, on the sectors, such as sector 402A, of the target data track N 302A. The variations in the amount of encroachment from the sectors 402 of the adjacent track N−1 302B on the target data track N may result from the factors described above in regard to FIG. 3 that result in each data track not being perfectly circular, such as platter shift, platter geometry irregularity, vertical and horizontal platter vibrations, air fluctuations, mechanical alignment problems and the like. While FIG. 5 shows an example of aligned sector format, it will be appreciated similar variations in encroachment of data may occur between two data tracks 302B and 302A formatted in the non-aligned sector format, as well.

FIG. 5 further shows an example of variation in encroachment within a single sector 402A on the target data track 302A that may occur from one or more sectors, such as sector 402B on the adjacent data track N−1 302B. As may be seen in the figure, the encroachment from the sector(s) 402B of the adjacent track N−1 302B may be very small near the beginning of the target sector 402A but more significant near the end of the sector. Because of this variation in encroachment within the sector, conventional sector-based ITIC solutions may not be able to determine a precise ITI factor for the nearby sector(s) 402B in order to decode the data from read single of the target sector 402A.

According to embodiments, the target sector 402A may be divided into multiple areas or segments 502A-502F (referred to herein generally as segment 502 or segments 502). ITIC may be performed for each of the segments 502 individually. This allows for one or more ITI factor values describing the nature of the encroachment or influence of the data from the nearby sector(s) 402 in the read signal from each segment 502 to be determined independently. The independently determined ITI factor value(s) for each segment may then be used to cancel ITI from the read signal from each segment 502 in an iterative fashion, until all the data of target sector 402A has been decoded.

The number and size of the segments 502 into which the target sector 402A is divided may depend on a number of factors. In some embodiments, a fixed number of segments 502 may be utilized in cancelling ITI in all target sectors 402A on the disk 202. For example, the target sector 402A may be divided into six or eight equally-sized segments 502. The fixed number of segments 502 to be utilized may be determined by experimentation with similar types of storage devices 200 to improve performance of the ITIC process. In some embodiments, the number of segments 502 to be utilized may be determined on a device-by-device basis, during burn-in ("B/I") processing of the storage device 200, for example. In further embodiments, the number of segments 502 utilized may depend on an amount of variation in the ITI within a specific target sector 402A. For example, ITIC may be attempted in a target sector 402A iteratively while increasing the number of segments 502 until a correct read is obtained. In further embodiments, the number of segments 502 utilized may depend on the specific storage device 200, disk 202, data track 302, sector 402 or a combination of these and other factors.

Figure 6:
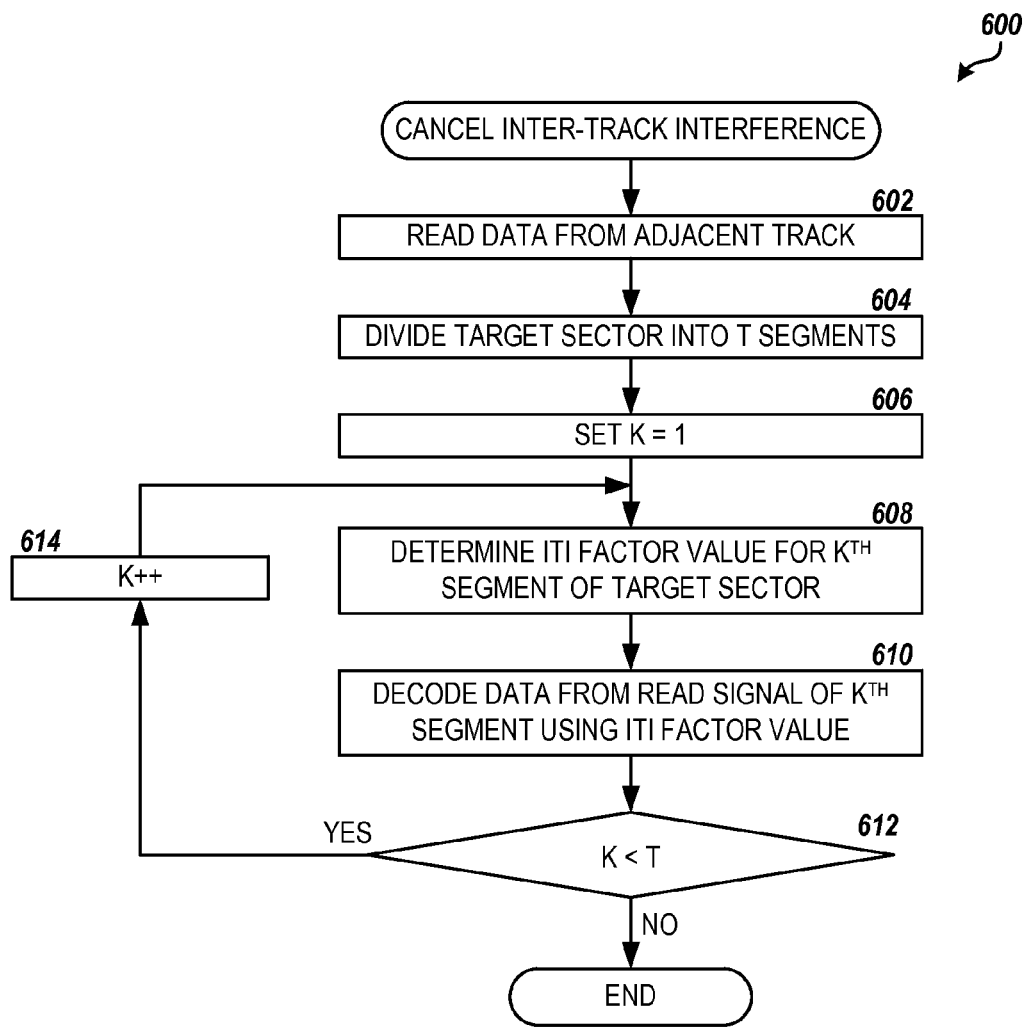
FIG. 6 is a flow diagram showing another routine for cancelling inter-track interference utilizing size-adjustable segments, according to embodiments described herein.

FIG. 6 illustrates one routine 600 for cancelling inter-track interference in a target sector 402A utilizing size-adjustable segments, according to some embodiments. According to embodiments, the routine 600 may be performed in conjunction with the read of the target sector 402A from the disk 202 during normal operation or "user mode" of the storage device 200. In some embodiments, the routine 600 may be performed by the size-adjustable ITIC module 240 described above in regard to FIG. 2, operating in conjunction with the ITIC mechanism 228 of the storage device 200. In further embodiments, the routine 600 may be performed by the controller 220 of the storage device 200, by external processors or computing systems accessing data from the device or some other combination of modules, processors and devices.

The routine 600 begins at step 602, where the size-adjustable ITIC module 240 reads data from one or more nearby sectors 402 from a data track 302 adjacent to the data track containing the target sector of the read. For example, when performing a read on target sector 402A of track N 302A, the size-adjustable ITIC module 240 may read one or more sectors, such as sector 402B, from adjacent track N−1 302B, as shown in FIG. 5. It will be appreciated that when reading data tracks 302 formatted with the aligned sector format, the size-adjustable ITIC module 240 may only need to read a single nearby sector 402B from the adjacent data track N−1 302B, while in the case of non-aligned sector format, the size-adjustable ITIC module may read two or more sectors from the adjacent data track N−1. The size-adjustable ITIC module 240 may store the data read from the adjacent data track in the memory 230 of the controller 220 or other storage area of the storage device 200 for use in performing ITIC, as is described below.

From step 602, the routine 600 proceeds to step 604, where the size-adjustable ITIC module 240 divides the target sector 402A into a number T of segments 502. As described above in regard to FIG. 5, the number T of segments 502 utilized may be fixed, may be based on a determination of ITI from the adjacent track N−1 302B during the B/I process of the storage device 200, or may be based on a combination of these and other factors. In some embodiments, the size-adjustable ITIC module 240 divides the target sector 402A into six equally-sized segments 502A-502F. Next, the routine proceeds to step 606, where the size-adjustable ITIC module 240 sets an index K to indicate a first of the T segments 502 is to be processed.

From step 606, the routine 600 proceeds to step 608, where the size-adjustable ITIC module 240 causes ITIC to be performed on the $K^{th}$ segment 502. In some embodiments, the size-adjustable ITIC module 240 may invoke the ITIC mechanism 228 of the storage device 200 in order to perform ITIC on the indicated segment 502. For example, the size-adjustable ITIC module 240 may provide the ITIC mechanism 228 with the position and size of the segment within the read signal from the target sector 402A. The size-adjustable ITIC module 240 may further supply the ITIC mechanism 228 with the applicable data from the nearby sectors 402B read from the adjacent track N−1 302B in step 602.

According to some embodiments, the ITIC mechanism 228 may use the read signal read from the segment 502 and the data read from the adjacent track and provided by the size-adjustable ITIC module 240 to determine an ITI factor value for the segment, as shown at step 608. The routine 600 then proceeds from step 608 to step 610, where the ITIC mechanism 228 uses the ITI factor value and the provided data from the nearby sectors to cancel the inter-track interference in the read signal for the segment in order to decode the data for that segment. It will be appreciated that the ITIC mechanism 228 may implement any of a number of ITIC processes or algorithms known in the art. In further embodiments, the size-adjustable ITIC module 240 may perform the ITIC for each segment using ITI factor value(s) supplied by the ITIC mechanism 228 on a segment by segment basis. In some embodiments, the size-adjustable ITIC module 240 may not use the ITIC mechanism 228 of the storage device 228 in performing ITIC on each segment and instead implement steps 608 and 610 as described above.

By performing ITIC on each segment individually, independent ITI factor values describing the nature of the encroachment or influence of the data from the nearby sector(s) 402 in that segment 502 may be determined and used to cancel ITI from the read signal from that segment. This may improve the accuracy of ITIC processing of target sectors 402 containing varying levels of ITI within the sector. Increasing the accuracy of ITIC during reads may reduce the number of read-retries required for a target sector or track, thus improving the overall read response time of the storage device 200. In addition, dividing the sector 402 into segments 502 may allow segments with a smaller amount of encroachment to be recovered without ITIC, thereby further improving performance. For example, as shown in FIG. 5, segments 502A, 502B and 502C may be decoded without the use of ITIC, while the methods and processes described herein may be utilized to decode the data in segments 502D, 502E, and 502F within the target sector 402A.

From step 610, the routine 600 proceeds to step 612, where the size-adjustable ITIC module 240 determines if the last segment 502 of the target sector 402A have been processed, i.e. whether value of the index K less than the number of segments T into which the target sector was divided. If the last segment 502 has not been processed, then the routine 600 proceeds from step 612 to step 614, where the value of the index K is incremented to indicate the next segment 502 is to be processed. From step 614, the routine returns to step 608, where the size-adjustable ITIC module 240 causes ITIC to be performed on the next segment 502, and the steps are repeated in an iterative fashion until all segments have been processed. If at step 612, if the size-adjustable ITIC module 240 determines the last segment 502 of the target sector 402A has been processed, the routine 600 ends. The size-adjustable ITIC module 240 may then aggregate the data decoded for each segment 502 of the target sector 402A in order to satisfy the read for the sector.

It will appreciated that the other methods of iterating through the segments 502 into which the target sector 402A has been divided may be used by the size-adjustable ITIC module 240 beyond the use of the index K as described herein, and it is intended that all such methods be included in this application. It will be further appreciated that while the routine 600 is described as cancelling inter-track interference from a single adjacent track N−1 302B, similar routines and processes may be used to cancel inter-track interference from two or more adjacent data tracks, such as tracks N+1, N−2, N+2 and the like.

Based on the foregoing, it will be appreciated that technologies for cancelling inter-track interference in a storage device utilizing size-adjustable are presented herein. While embodiments are described herein in regard to an HDD device, it will be appreciated that the embodiments described in this disclosure may be used to cancel inter-track interference in any storage device containing data stored in sector units of substantially parallel or substantially concentric tracks on the storage media, including but not limited to, a magnetic disk drive, a hybrid magnetic and solid state drive, a magnetic tape drive, an optical disk storage device, an optical tape drive and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   reading data from one or more sectors of an adjacent track of a recording medium, the one or more sectors of the recording medium being adjacent to a target sector on a target track of the recording medium;
   dividing the target sector into a plurality of segments;
   determining a first inter-track interference factor value for a first segment of the plurality of segments based on a read signal from the first segment and the data from the one or more sectors of the adjacent track;
   decoding data from the read signal read from the first segment using the first inter-track interference factor value;
   determining a second inter-track interference factor value for a second segment of the plurality of segments based on a read signal from the second segment and the data from the one or more sectors of the adjacent track, the second inter-track interference value independent of the first inter-track interference value; and
   decoding data from the read signal read from the second segment using the second inter-track interference factor value.

2. The method of claim 1, further comprising repeating the decoding step for a remainder of the plurality of segments of the target sector.

3. The method of claim 1, wherein the decoding steps are performed by an inter-track interference cancellation mechanism of a storage device containing the recording medium.

4. The method of claim 3, wherein the data read from the one or more sectors of the adjacent track is stored in a controller of the storage device and provided to the inter-track interference cancellation mechanism for decoding the data during reading of the target sector.

5. The method of claim 3, wherein performing inter-track interference cancellation across the plurality of segments improves a read response time of a storage device containing the recording medium.

6. The method of claim 1, wherein the target sector is divided into a fixed number of equally-sized segments.

7. The method of claim 1, wherein the first inter-track interference factor value comprises one of an alpha factor value or a cross-correlation factor value.

8. A computer-readable storage medium having processor-executable instructions stored thereon that, when executed by a processor, cause the processor to:
   read data from one or more sectors of an adjacent track of a recording medium, the one or more sectors of the recording medium being adjacent to a target sector on a target track of the recording medium;
   divide the target sector into a plurality of segments;
   determine an inter-track interference factor value corresponding to each of the plurality of segments based on a read signal from the segment and corresponding data from the one or more sectors of the adjacent track; and
   perform inter-track interference cancellation on each of the plurality of segments using the corresponding inter-track interference factor value.

9. The computer-readable storage medium of claim 8, wherein the inter-track interference factor value determined for a first segment of the plurality of segments is different from the inter-track interference factor value determined for a second segment of the plurality of segments.

10. The computer-readable storage medium of claim 8, wherein the inter-track interference factor value determined for each of the plurality of segments comprises one of an alpha factor value or a cross-correlation factor value.

11. The computer-readable storage medium of claim 8, wherein performing inter-track interference cancellation on each of the plurality of segments comprises using inter-track interference cancellation circuitry of a storage device containing the recording medium.

12. The computer-readable storage medium of claim 11, wherein the data read from the one or more sectors of the adjacent track is provided by the processor to the inter-track interference cancellation circuitry performing inter-track interference cancellation on each of the plurality of segments.

13. The computer-readable storage medium of claim 8, wherein the target sector is divided into a fixed number of equally-sized segments.

14. A system comprising:
a hard disk drive comprising a recording medium; and
a controller comprising a processor and a memory, the controller configured to
read data from one or more sectors of an adjacent track of the recording medium, the one or more sectors of the recording medium being adjacent to a target sector on a target track of the recording medium,
divide the target sector into a plurality of segments,
determine an inter-track interference factor value for a first segment of the plurality of segments using a read signal read from the first segment and corresponding data from the one or more sectors of the adjacent track, and
decode data from the read signal using the corresponding data from the one or more sectors of the adjacent track and the inter-track interference factor.

15. The system of claim 14, wherein the controller is further configured to cause the processor to repeat the determining and decoding step for a remainder of the plurality of segments of the target sector.

16. The system of claim 14, wherein the determining and decoding steps are performed by inter-track interference cancellation circuitry of the controller.

17. The system of claim 16, wherein the data read from the one or more sectors of the adjacent track is stored in the memory and provided by the processor to the inter-track interference cancellation circuitry for determining the inter-track interference factor and decoding the data during reading of the target sector.

18. The system of claim 14, wherein the target sector is divided into six equally-sized segments.

* * * * *